(12) United States Patent
Feng et al.

(10) Patent No.: US 7,361,418 B2
(45) Date of Patent: Apr. 22, 2008

(54) LUMINARY MATERIAL AND METHOD FOR MANUFACTURING THE SAME

(75) Inventors: Chung Chih Feng, Kaoshiung (TW); Yuan Fang Tsai, Kaoshiung County (TW); Cheng Ming Lin, Kaoshiung County (TW); Chien Chia Huang, Kaoshiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 160 days.

(21) Appl. No.: 11/444,354

(22) Filed: Jun. 1, 2006

(65) Prior Publication Data
US 2007/0281563 A1  Dec. 6, 2007

(51) Int. Cl.
*B32B 9/00* (2006.01)
*B32B 19/00* (2006.01)

(52) U.S. Cl. .................................. 428/690; 442/131

(58) Field of Classification Search ................ 442/131, 442/327; 428/690
See application file for complete search history.

*Primary Examiner*—Lynda Salvaore
(74) *Attorney, Agent, or Firm*—Volentine & Whitt, PLLC

(57) ABSTRACT

The present invention relates to a luminary material comprising a substrate; a luminary layer formed on a surface of the substrate; and a surface layer comprising a first portion and a second portion, wherein the first portion allows stronger light to be emitted from the luminary layer than the second portion. The luminary material according to the invention exhibits various colors, patterns and/or textures formed on the surface. Therefore, the luminary material is qualified as a decorative material in the light. A method for manufacturing the luminary material is also provided.

20 Claims, 4 Drawing Sheets

LUMINARY MATERIAL AND METHOD FOR MANUFACTURING THE SAME

BACKGROUND OF THE INVENTION

1. Field of the Invention

The present invention relates to a luminary material and a method for manufacturing the luminary material.

2. Description of the Related Art

A luminary component, also known as a photoluminescent component, is either visibly phosphorescent or visibly fluorescent. In the visibly phosphorescent situation, it emits a continued luminescent radiation after termination of the exciting radiation, while the luminescent radiation ceases as soon as the exciting radiation is removed in the visibly fluorescent situation. The luminary component provides a "glow-in-the-dark" material after having been exposed to light, either natural or artificial. It has been applied broadly in watch faces, clothes, furniture, and the like and in safety features such as lighted exit signs. The luminary component is well developed in this field.

A conventional luminary material usually comprises a substrate and a luminary layer formed on a surface of the substrate. The luminary layer is made from a luminary component to exhibit phosphorescent or florescent properties. In view of the light property of the luminary component, the luminary layer should be formed on the surface of the substrate. Since the color of the luminary component in the light is usually olive drab or light blue, the appearance of the conventional luminary material exhibits the same dull color. Several efforts have been made to improve the appearance of the conventional luminary material, but the effects are not satisfactory. Direct addition of a pigment or dye into the luminary component affects the light property dramatically. The method of directly coating a pigment or dye layer onto the luminary layer is also useless, because the light property is eliminated. In another aspect, although luminary components with different colors are available, mixing the luminary components with different colors does not work due to serious interference and disturbance. Furthermore, these luminary components do not distribute evenly, and the luminary material still shows the two original colors of the luminary components. As a result, the conventional luminary material is unqualified as a decorative material.

Therefore, a luminary material as a decorative material that has varied features and colors in the light is needed in this field.

SUMMARY OF THE INVENTION

One object of the present invention is to provide a luminary material. The luminary material of the invention comprises a substrate, a luminary layer and a surface layer. The substrate is selected from the group consisting of a woven fabric, a non-woven fabric, leather, a micro fiber and a resin. The luminary layer is formed on a surface of the substrate. The surface layer is formed on a surface of the luminary layer and comprises a first portion and a second portion. The first portion allows stronger light to be emitted from the luminary layer than the second portion.

Another object of the present invention is to provide a method for manufacturing the luminary material as mentioned above. The method of the invention comprises steps of: providing the surface layer, the luminary layer and the substrate; and applying the surface layer and the substrate onto two surfaces of the luminary layer, respectively.

The luminary material according to the invention not only preserves a satisfied light property of the luminary layer but also allows the luminary material according to the invention to exhibit various colors, patterns and/or textures formed on the surface. Therefore, the luminary material is qualified as a decorative material in the light.

DETAILED DESCRIPTION OF THE INVENTION

Figure 1:
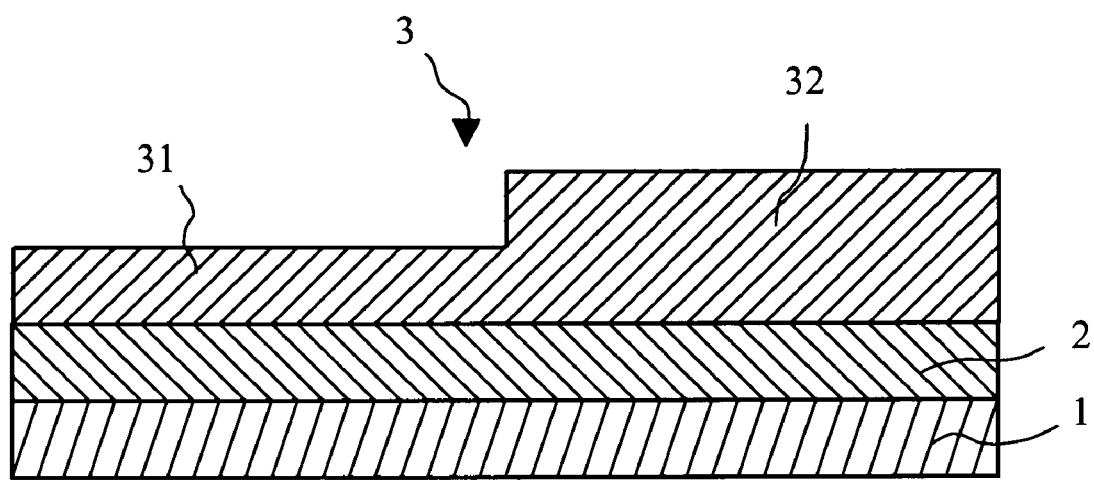
FIG. 1 illustrates the cross-sectional view of the luminary material according to one embodiment of the invention.
Figure 2:
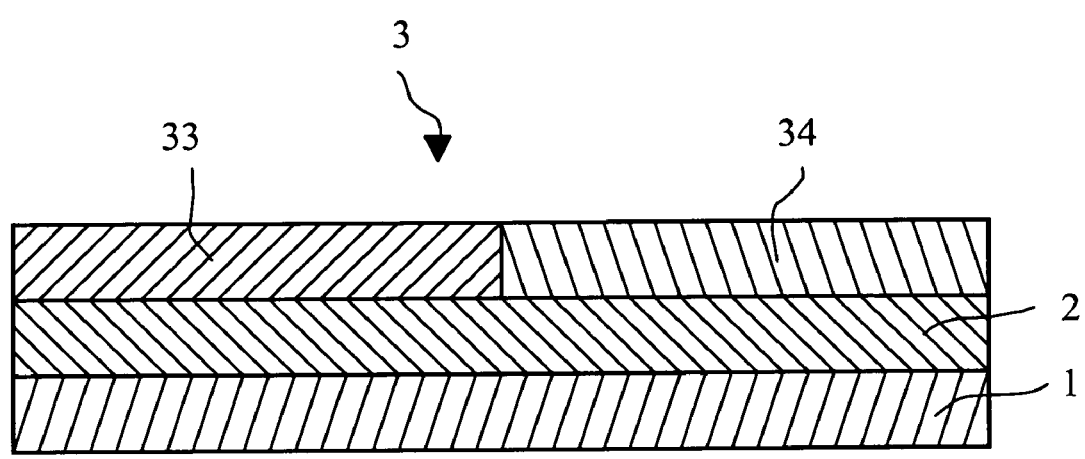
FIG. 2 illustrates the cross-sectional view of the luminary material according to another embodiment of the invention.

The present invention provides a luminary material. Referring to FIGS. 1 and 2, the luminary material of the invention comprises a substrate 1, a luminary layer 2 and a surface layer 3. The substrate is selected from the group consisting of a woven fabric, a non-woven fabric, leather, a micro fiber and a resin. The luminary layer 2 is formed on a surface of the substrate 1. The surface layer 3 is formed on a surface of the luminary layer 2 and comprises a first portion 31, 33 and a second portion 32, 34. The first portion 31, 33 allows stronger light to be emitted from the luminary layer than the second portion 32, 34.

According to the invention, the applicable substrate is selected from the group consisting of a woven fabric, a non-woven fabric, leather, a micro fiber and a resin. Such substrate provides a suitable mechanical property for supporting the luminary layer and for acting as a decorative material for use in clothes, furniture, and the like and in safety features in the light. Preferably, the substrate is leather; more preferably, the leather is artificial leather. In one preferred embodiment of the invention, the leather comprises a base material selected from the group consisting of a woven fabric and a non-woven fabric.

According to the invention, the luminary layer preferably comprises a luminary component and a resin. As used herein, the term "a luminary component" or "a photoluminescent component" refers to a visibly phosphorescent component or a visibly fluorescent component. As used herein, the term "visibly phosphorescent component" refers to a component that emits a continued luminescent radiation after termination of the exciting radiation. As used herein, the term "visibly fluorescent component" refers to a component that emits the luminescent radiation and ceases the emission as soon as the exciting radiation is removed. Examples of the luminary component according to the invention are LumiNova® GLL-300M exhibiting olive drab color in the light and blue color in dark and LumiNova® GLL-300F exhibiting light olive drab color in the light and green color in dark. The luminary component can be provided in the forms of powder, grease, liquid, or solid. In another aspect, the resin in the luminary layer is preferably selected from the group consisting of polyurethane, poly (vinyl chloride), acrylic resins, polycarbonate, and epoxy resins.

The present invention is characterized in providing the surface layer 3 formed on a surface of the luminary layer 2. The surface layer according to the invention comprises a first portion 31, 33 and a second portion 32, 34. As defined herein, the first portion allows stronger light to be emitted from the luminary layer than the second portion. The design of these two portions of the surface layer according to the invention not only preserves a satisfactory light property of the luminary layer but also allows the luminary material according to the invention to exhibit various colors, patterns and/or textures formed on the surface. Therefore, the luminary material has the advantages that it can glow in the dark and has a desired appearance in the light.

In one preferred embodiment of the invention (referring to FIG. 1), the thickness of the first portion 31 of the surface layer is less than that of the second portion 32. The difference of the thickness between the first portion and the second portion allows different strengths of the emitted light. Furthermore, the distribution of thickness provides desired textures of the luminary material according to the invention.

In one preferred embodiment according to the invention, the surface layer comprises a colored material and a resin. The preferable content of the colored material ranges from about 0.1 wt % to about 12 wt %. In another aspect, the colored material is preferably selected from the group consisting of a pigment, a dye and a pearl powder. Examples of the resin in the surface layer are polyurethane, poly(vinyl chloride), acrylic resins, polycarbonate, and epoxy resins. By adding the colored material, the surface layer shows different colors, and it is possible to change the color of the luminary material.

The manners of the first portion and the second portion in the surface layer comprising the colored material are varied.

In one embodiment of the present invention, the amount of the colored material of the first portion of the surface layer is less than that of the second portion. The different colored material amounts of the first portion and the second portion allow different light emission. Furthermore, it provides desired colors, patterns, and textures of the luminary material according to the invention.

In another embodiment of the present invention (referring to FIG. 2), the first portion 33 of the surface layer comprises a first colored material, and the second portion 34 of the surface layer comprises a second colored material, wherein the first colored material differs from the second colored material. For example, the first colored material is a light-colored material that allows stronger light to be emitted from the luminary layer and through the first portion, and the second colored material is a dark-colored material that allows weaker light to be emitted from the luminary layer through the second portion. Furthermore, the different color distribution provides desired colors, patterns, and textures of the luminary material according to the invention.

Preferably, the luminary material according to the invention comprises a plurality of surface layers. In one embodiment of the invention, one of the surface layers comprises the colored material, and the other surface layers without the colored material are positioned under or over the surface layer comprising the colored material.

Preferably, the luminary material according to the invention further comprises an adhesion layer for adhering the luminary layer and the substrate. The adhesion layer can be applied to strengthen the binding boundary between the luminary layer and the substrate. In one embodiment of the invention, the adhesion layer is a resin such as polyurethane acting as a paste.

The luminary material in accordance with the invention is preferably manufactured according to a method comprising steps of: providing the surface layer, the luminary layer and the substrate; and applying the surface layer and the substrate onto two surfaces of the luminary layer, respectively.

The manners of providing the surface layer are varied according to what kind of surface layer is produced. For example, the colored material and the resin as mentioned above are mixed to provide the surface layer. Preferably, the colored material and the resin are prepared by curing to provide the surface layer.

According to the invention, the manner of providing the luminary layer are varied. For example, the luminary component and the resin as mentioned above are mixed to provide the luminary layer. Preferably, the luminary component and the resin are prepared by curing to provide the luminary layer.

According to the invention, the choice of the substrate is made according to the proposed use of the luminary material. For example, the substrates of woven fabric, the non-woven fabric and the micro fiber are provided for use in clothes. The substrate of leather is provided for use in shoes, clothes and furniture. The substrate of the resin is provided for use in furniture and safety features.

The manner of applying the surface layer onto one surface of the luminary layer varies according to the form of the surface layer to be manufactured.

In one embodiment of the invention, when manufacturing a surface layer having a different thickness of the first portion and the second portion, the surface layer is formed on a releasing paper comprising a first corresponding portion and a second corresponding portion, wherein the thickness of the first corresponding portion is larger than that of the second corresponding portion for forming the first portion and the second portion of the surface layer, respectively. An example of forming the surface layer on the releasing paper is floating coating. Preferably, an optional dry step is provided after floating coating.

In another embodiment of the invention, when manufacturing the surface layer with various colors, patterns, and textures, the surface layer is printed on the luminary layer. The desired color distribution and choices can be achieved by printing the surface layer onto the luminary layer.

Preferably, the method according to the invention further comprises a curing step. The curing step is usually performed when the resin is provided in the surface layer, luminary layer, and/or substrate. The room temperature curing and the high-temperature curing are both applicable in the invention.

The manner of applying the substrate onto the other surface of the luminary layer depends on the kinds of substrate and luminary layer. Preferably, the substrate is adhered to the surface of the luminary layer by an adhesion layer. For example, a two-component polymer is utilized for adhering the substrate and the luminary layer.

The following examples are given for the purpose of illustration only but not intended to limit the scope of the present invention.

EXAMPLE 1

Surface layer: A releasing paper (Favini® ASTRA-KAN™) was utilized for providing the textures of a surface layer. The surface layer comprised one component polyurethane resin and 0.5% to 10% pigment (TAH KONG CHEMICAL INDUSTRIAL CORP. 41P series) with a coating weight of 48 g/m$^2$.

Luminary layer: The luminary layer comprised one component polyurethane resin (U-BEST POLYMER INDUS- TRY CO., LTD®, AT-508E™) and 30% luminary component (LumiNova(® GLL-300F) with a coating weight of 120 g/m².

Adhesion layer: The adhesion layer comprised two components polyurethane resin (U-BEST POLYMER INDUSTRY CO., LTD®, BD636M™) with a coating weight of 120 g/m².

Substrate: The substrate is artificial leather (San Fang).

Process: The surface layer was coated onto the releasing paper by floating coating and then the surface layer was dried. The luminary layer was then applied onto the surface layer by floating coating and then dried. Further, the adhesion layer was applied onto the dried luminary layer and then the substrate was adhered to the adhesion layer. The sample was cured by staying at room temperature for three days or at 60° C. for 1.5 days. The product was then obtained by removing the releasing layer.

Figure 3:
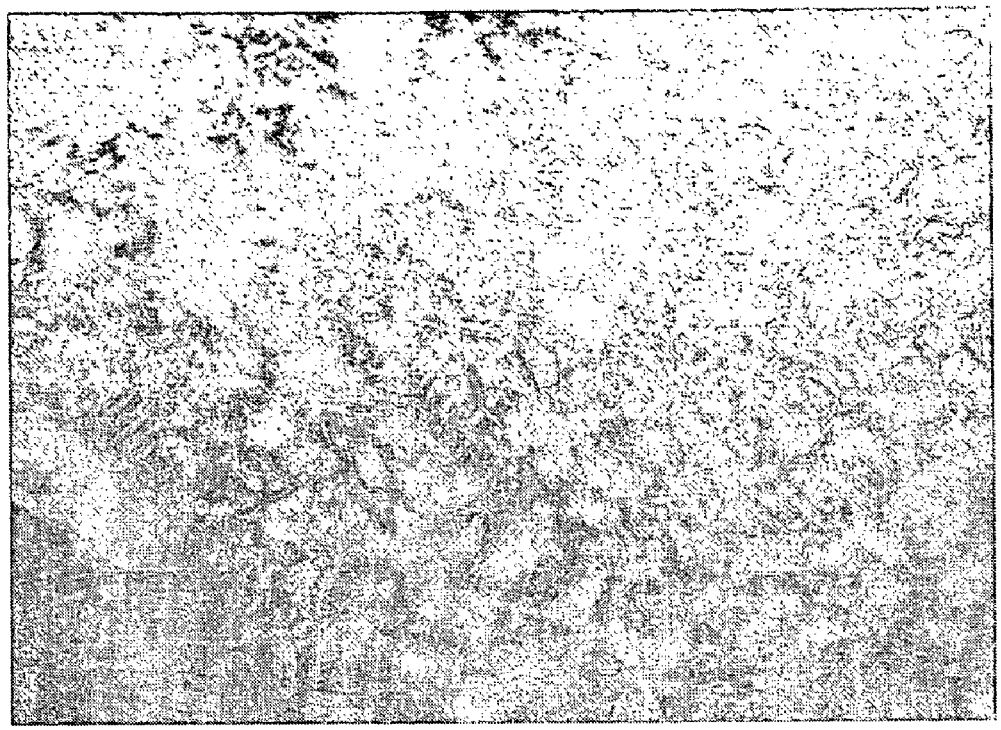
FIG. 3 illustrates the photograph of the luminary material in the light according to the invention.
Figure 4:
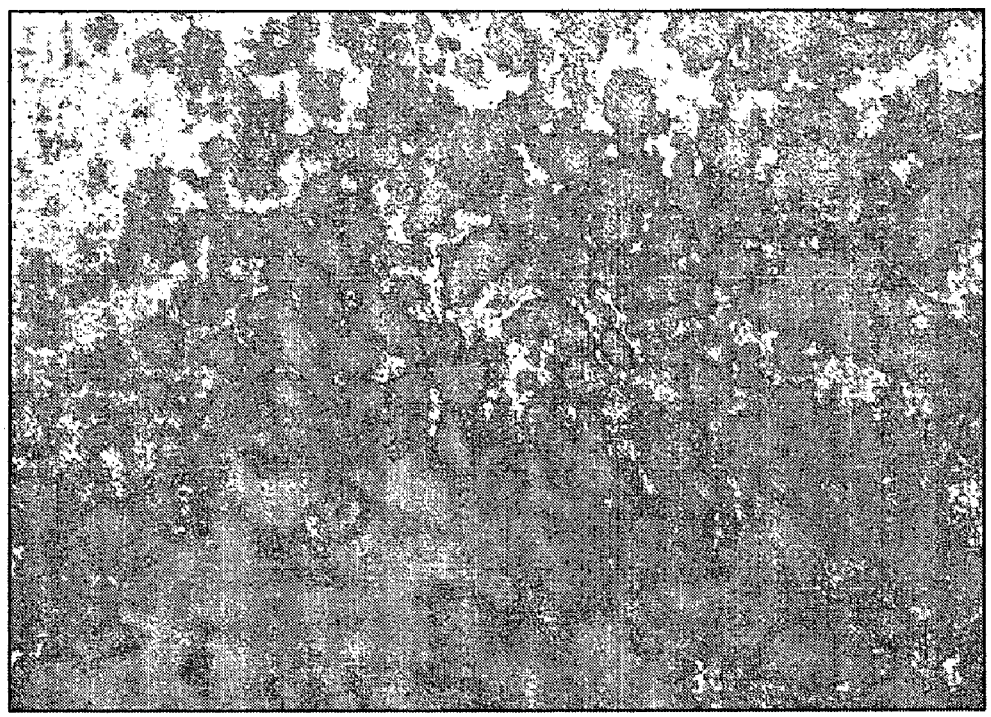
FIG. 4 illustrates the photograph of the luminary material in the dark according to the invention.

Luminary material. The luminary material manufactured as mentioned above shows specific colors, patterns and textures in the light (referring to FIG. 3). Furthermore, the light property thereof is also qualified in the dark (referring to FIG. 4). Therefore, the present invention provides a decorative luminary material.

EXAMPLE 2

The surface layer, luminary layer, adhesion layer, and substrate were the same to those in Example 1.

Printing layer: The printing layer comprised one component polyurethane resin and 0.5% to 10% pigment (TAH KONG CHEMICAL INDUSTRIAL CORP. 41P series) with a coating weight of 24 g/m².

Process I: The surface layer was coated onto the releasing paper by floating coating and then the surface layer was dried. The luminary layer was then applied onto the surface layer by floating coating and then dried. Further, the adhesion layer was applied onto the dried luminary layer and then the substrate was adhered to the adhesion layer. The sample was cured by staying at room temperature for three days or at 60° C. for 1.5 days. The semi-product was then obtained by removing the releasing layer. The semi-product was printed with the printing layer and then dried for obtaining the final product.

Process II:

Component (A): The surface layer was coated onto the releasing paper by floating coating and then the surface layer was dried. The luminary layer was then applied onto the surface layer by floating coating and then dried. Further, the adhesion layer was applied onto the dried luminary layer and then the substrate was adhered to the adhesion layer. The sample was cured by staying at room temperature for three days or at 60° C. for 1.5 days. The semi-product was then obtained by removing the releasing layer. The semi-product was printed and then dried for obtaining the Component (A).

Final product: The surface layer was coated onto the releasing paper by floating coating. Further, the adhesion layer was applied onto the surface layer and then the Component (A) was adhered to the adhesion layer. The sample was cured by staying at room temperature for three days or at 60° C. for 1.5 days. The semi-product was then obtained by removing the releasing layer. The semi-product was printed and then dried for obtaining the final product.

While embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A luminary material comprising:
   a substrate selected from the group consisting of a woven fabric, a non-woven fabric, leather, a micro fiber and a resin;
   a luminary layer formed on a surface of the substrate; and
   a surface layer formed on a surface of the luminary layer and comprising a first portion and a second portion, wherein the first portion allows stronger light to be emitted from the luminary layer than the second portion.

2. The luminary material according to claim 1, wherein the leather is artificial leather.

3. The luminary material according to claim 2, wherein the leather comprises a base material selected from the group consisting of a woven fabric and a non-woven fabric.

4. The luminary material according to claim 1, wherein the luminary layer comprises a luminary component and a resin.

5. The luminary material according to claim 4, wherein the resin is selected from the group consisting of polyurethane, poly(vinyl chloride), acrylic resins, polycarbonate, and epoxy resins.

6. The luminary material according to claim 1, wherein the thickness of the first portion of the surface layer is less than that of the second portion.

7. The luminary material according to claim 1, wherein the surface layer comprises a colored material and a resin.

8. The luminary material according to claim 7, wherein the content of the colored material ranges from about 0.1 wt % to about 12 wt %.

9. The luminary material according to claim 7, wherein the colored material is selected from the group consisting of a pigment, a dye and a pearl powder.

10. The luminary material according to claim 7, wherein the resin is selected from the group consisting of polyurethane, poly(vinyl chloride), acrylic resins, polycarbonate, and epoxy resins.

11. The luminary material according to claim 7, wherein the amount of the colored material of the first portion of the surface layer is less than that of the second portion.

12. The luminary material according to claim 7, wherein the first portion of the surface layer comprises a first colored material, the second portion of the surface layer comprises a second colored material, and the first colored material differs from the second colored material.

13. The luminary material according to claim 1 further comprising an adhesion layer for adhering the luminary layer and the substrate.

14. A method for manufacturing the luminary material according to claim 1, comprising steps of:
   providing the surface layer, the luminary layer and the substrate; and
   applying the surface layer and the substrate onto two surfaces of the luminary layer, respectively.

15. The method according to claim 14, wherein the surface layer is formed on a releasing paper comprising a first corresponding portion and a second corresponding portion, wherein the thickness of the first corresponding portion is larger than that of the second corresponding portion for forming the first portion and the second portion of the surface layer, respectively.

16. The method according to claim 15, wherein forming the surface layer on the release paper is done by floating coating.

17. The method according to claim 14, wherein applying the surface layer on the luminary layer is done by printing.

18. The method according to claim 14, wherein applying the surface layer on the luminary layer is by done floating coating.

19. The method according to claim 14, further comprising a curing step.

20. The method according to claim 14 further comprising applying an adhesion layer between the substrate and the surface of the luminary layer.

* * * * *